US012001511B2

(12) United States Patent
Cao et al.

(10) Patent No.: US 12,001,511 B2
(45) Date of Patent: Jun. 4, 2024

(54) SYSTEMS AND METHODS OF RESOURCE CONFIGURATION OPTIMIZATION FOR MACHINE LEARNING WORKLOADS

(71) Applicant: HEWLETT PACKARD ENTERPRISE DEVELOPMENT LP, Houston, TX (US)

(72) Inventors: Lianjie Cao, Milpitas, CA (US); Faraz Ahmed, Milpitas, CA (US); Puneet Sharma, Milpitas, CA (US); Ali Tariq, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 731 days.

(21) Appl. No.: 17/199,294

(22) Filed: Mar. 11, 2021

(65) Prior Publication Data
US 2022/0292303 A1    Sep. 15, 2022

(51) Int. Cl.
*G06F 18/214*    (2023.01)
*G06F 9/50*    (2006.01)
(Continued)

(52) U.S. Cl.
CPC .......... *G06F 18/214* (2023.01); *G06F 9/5022* (2013.01); *G06F 9/5027* (2013.01);
(Continued)

(58) Field of Classification Search
CPC .... G06F 18/214; G06F 9/5022; G06F 9/5027; G06F 9/505; G06F 9/5061;
(Continued)

(56) References Cited

U.S. PATENT DOCUMENTS

2018/0300171 A1*  10/2018  Qiao ..................... G06F 9/5088
2019/0205745 A1*   7/2019  Sridharan ............. G06F 9/5061
2022/0075664 A1*   3/2022  Fawcett ................ G06F 9/4881

OTHER PUBLICATIONS

Ghodsi et al., "Dominant resource fairness: Fair allocation of multiple resource types", Proceedings of the 8th USENIX Conference on Networked Systems Design and Implementation, 2011, 15 pages.

(Continued)

*Primary Examiner* — Asghar H Bilgrami
(74) *Attorney, Agent, or Firm* — Sheppard Mullin Richter & Hampton LLP

(57) ABSTRACT

Systems and methods can be configured to determine a plurality of computing resource configurations used to perform machine learning model training jobs. A computing resource configuration can comprise: a first tuple including numbers of worker nodes and parameter server nodes, and a second tuple including resource allocations for the worker nodes and parameter server nodes. At least one machine learning training job can be executed using a first computing resource configuration having a first set of values associated with the first tuple. During the executing the machine learning training job: resource usage of the worker nodes and parameter server nodes caused by a second set of values associated with the second tuple can be monitored, and whether to adjust the second set of values can be determined. Whether a stopping criterion is satisfied can be determined. One of the plurality of computing resource configurations can be selected.

20 Claims, 8 Drawing Sheets

(51) Int. Cl.
| | |
|---|---|
| *G06F 11/30* | (2006.01) |
| *G06F 11/34* | (2006.01) |
| *G06F 18/2415* | (2023.01) |
| *G06N 3/0464* | (2023.01) |
| *G06N 3/063* | (2023.01) |
| *G06N 3/0985* | (2023.01) |
| *G06N 7/01* | (2023.01) |
| *G06N 20/00* | (2019.01) |
| *G06V 40/16* | (2022.01) |

(52) U.S. Cl.
CPC ............ *G06F 9/505* (2013.01); *G06F 9/5061* (2013.01); *G06F 11/3414* (2013.01); *G06F 18/24155* (2023.01); *G06N 20/00* (2019.01)

(58) Field of Classification Search
CPC ............ G06F 18/24155; G06F 9/5016; G06F 9/5066; G06F 9/5077; G06F 9/5083; G06F 11/3051; G06N 20/00; G06N 3/0464; G06N 3/063; G06N 7/01; G06V 40/172
See application file for complete search history.

(56) References Cited

OTHER PUBLICATIONS

Gurobi Optimization, Inc., "Gurobi Optimizer", Reference Manual, 2017, Version 7.0, 693 pages.

Lee et al., "Automating System Configuration of Distributed Machine Learning", IEEE 39th International Conference on Distributed Computing Systems (ICDCS), 2019, 11 pages.

Li et al., "A System for Massively Parallel Hyperparameter Tuning", Proceedings of the 3rd MLSys Conference, 2020, Mar. 16, 2020, 17 pages.

Peng et al., "Optimus: An Efficient Dynamic Resource Scheduler for Deep Learning Clusters", ACM, Apr. 23-26, 2018, 14 pages.

U.S. Appl. No. 16/874,479; Cao et al. "Systems and Methods of Resource Configuration Optimization for Machine Learning Workloads", filed May 14, 2020.

Zhang et al., "SLAQ: Quality-Driven Scheduling for Distributed Machine Learning", ACM, Sep. 24-27, 2017, 15 pages.

\* cited by examiner

SYSTEMS AND METHODS OF RESOURCE CONFIGURATION OPTIMIZATION FOR MACHINE LEARNING WORKLOADS

DESCRIPTION OF THE RELATED ART

Machine learning (ML) can refer to a method of data analysis in which the building of an analytical model is automated. ML is commonly considered to be a branch of artificial intelligence (AI), where systems are configured and allowed to learn from gathered data. Such systems can identify patterns and/or make decisions with little to no human intervention using the analytical model developed during training.

ML techniques are being used to solve increasingly challenging problems that involve analyzing larger and larger amounts of data. Hence, training ML models has become a resource-intensive and time-consuming process. One aspect of training ML models involves finding hyperparameter values that yield the best accuracy, referred to as hyperparameter tuning.

BRIEF DESCRIPTION OF THE DRAWINGS

The technology disclosed herein, in accordance with one or more embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof.

Figure 1:
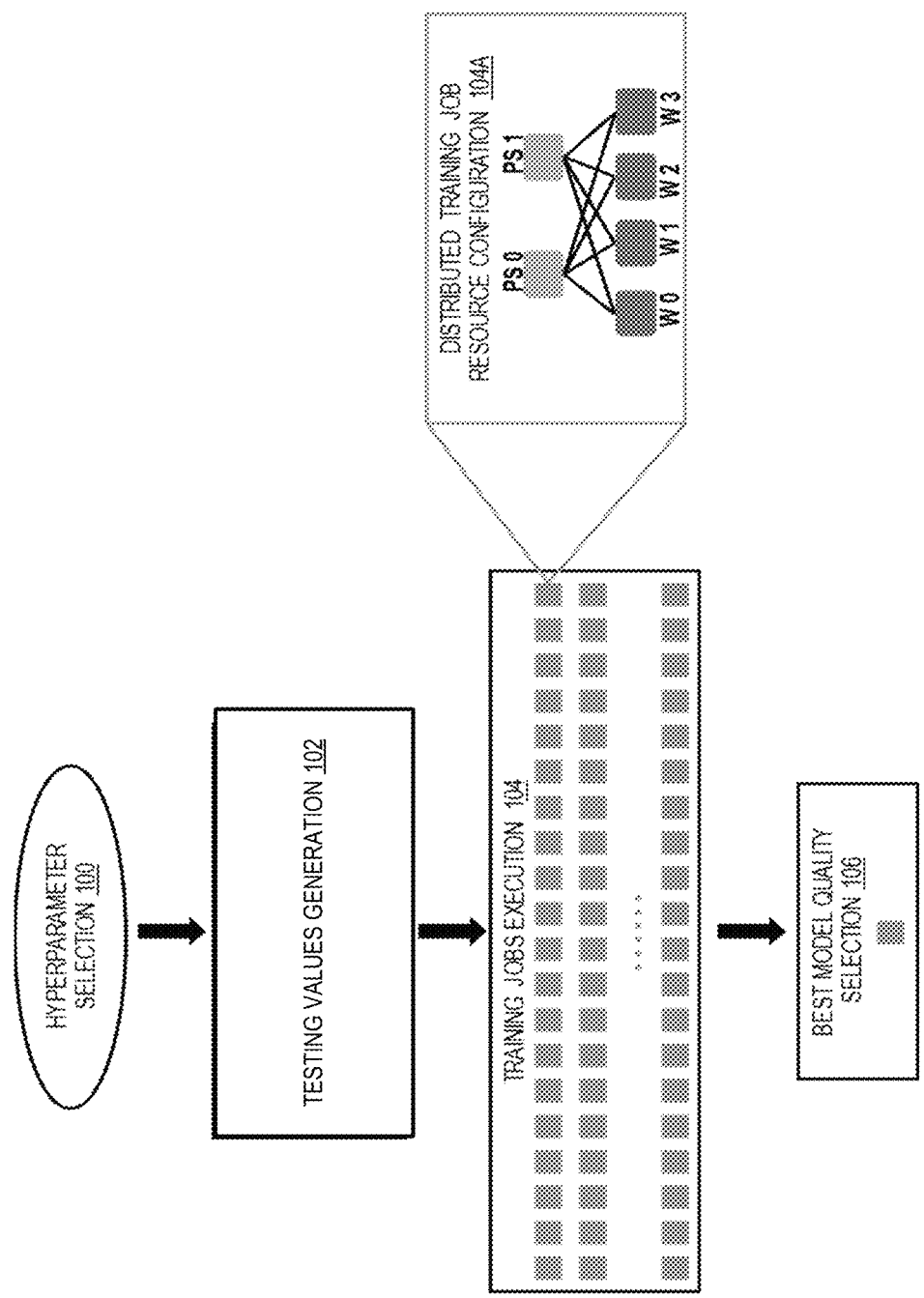
FIG. 1 illustrates an example hyperparameter tuning process context for which various embodiments may be implemented.

The figures are not intended to be exhaustive or to limit embodiments to the precise form disclosed. It should be understood that the invention can be practiced with modification and alteration, and that the disclosed technology be limited only by the claims and the equivalents thereof.

DETAILED DESCRIPTION

This application improves upon inventions disclosed in U.S. patent application Ser. No. 16/874,479 titled "SYSTEMS AND METHODS OF RESOURCE CONFIGURATION OPTIMIZATION FOR MACHINE LEARNING WORKLOADS" filed May 14, 2020, which is hereby incorporated by reference in its entirety.

As alluded to above, the training of ML models is becoming a more resource-intensive and time-consuming process as the complexity of ML models increases, and the size of datasets used to train ML models increases. The training of ML models generally follow an ML pipeline. The ML pipeline can generally include a process of: (1) objective definition; (2) data engineering; (3) model exploration; (4) production model training; and (5) model/inference serving. First, an objective for an ML-applicable task (e.g., image classification, product recommendation, autonomous vehicle navigation, or the like) is defined. Second, data can be collected and engineered (e.g., data cleaning, feature scaling, sample labeling, or the like) for use in ML training. Third, various models can be explored/evaluated to select an ML model for the objective. Fourth, once an ML model is selected, all the data sets that have been collected can be used to train a production ML model. Lastly, the trained production ML model can be used to service inference requests for the objective.

Particularly, the model exploration/evaluation (e.g., (3) model exploration process described above) can involve selection or tuning of hyperparameters. A hyperparameter is a parameter whose value is used to control ML learning process. The hyperparameters are used to train an ML model, but they are distinct from parameters of the ML model which are derived (e.g., node weights) through the training of the ML model. Some exemplary hyperparameters include:

Logistic regression: regularization term (L1, L2 and value of coefficient);
K-means/K-nearest neighbor: number of clusters K;
Support vector machine (SVM): regularization constant C, kernel parameter Y;
Random Forest: number of trees in a forest, maximum depth of a tree, etc.; and
Neural network: learning rate, number of epochs, size of mini-batch, etc.

These are examples and not meant to be limiting.

Hyperparameters can be classified as model hyperparameters, that refer to model selection task, or algorithm hyperparameters, that in principle have no influence on the performance of the model but affect the speed and quality of the learning process. Selection of a right (e.g., best or optimal) set of hyperparameters can greatly accelerate the (4) production model training that follows. The hyperparameter tuning involves selection of the right set of hyperparameters so that an ML model can be trained with efficiency and results in an accurate production ML model.

As described, the hyperparameter tuning occurs during the (3) model exploration/evaluation. Hyperparameter tuning typically involves a large number of exploratory experiments to test different combinations of possible values of various hyperparameters. The hyperparameter tuning can involve training an ML model with a small amount of data (e.g., small training jobs) to determine how well the model will work.

In some embodiments, the hyperparameter tuning can be accomplished using multiple computing nodes (e.g., nodes that are in a distributed configuration and parallelly process jobs). Jobs can be parallelized in the distributed configuration to potentially reduce the time needed to accomplish model exploration. For example, machine learning frameworks such as Tensorflow and PyTorch provide distributed mode for a given ML training job to improve the completion time by running computation workload in parallel. As will be described further with reference to FIG. 2 and FIG. 3, some of the nodes in the distributed configuration can be configured as parameter servers and/or worker nodes. A training job can be divided and executed on multiple worker nodes and provide respective results to parameter servers to be synchronized and aggregated. Each worker and parameter server node can be a bare metal machine, a virtual machine or a container. For instance, using distributed Tensorflow with Kubeflow on top of Kubernetes, a data scientist can deploy the ML training code using multiple containers and share the infrastructure with others. However, in such conventional technologies, data scientists still need to manually specify infrastructure-level resource configurations such as how many workers and parameter servers (as containers) need to be started and how to allocate resources (e.g., CPU and memory, virtual or physical) among these containers.

Different resource configurations may affect the job completion time significantly. For instance, an experimental data shows that allocating 6 vCPUs in different ways affects the job completion time up to 26.8%. For hyperparameter tuning, the impact can be further amplified by the execution of a massive number of ML training jobs for finding the best set of values. As mentioned above, conventional technologies (or lack of technologies) demand manual specification of resource configurations. Thus, an improved system or method that can determine the best configuration and allocation of computing resources for the hyperparameter tuning is greatly desired.

An improved approach rooted in computer technology can automatically determine the best resource configuration for nodes. Aware of computing resource budget (e.g., a total number of available nodes), the disclosed technology can arrange available nodes to be used as parameter servers and/or worker nodes. An optimal node arrangement for a distributed configuration can accelerate the model exploration/evaluation. Additionally, an optimal resource allocation for the nodes can further accelerate the model exploration/evaluation. Finding the optimal node arrangement and optimal resource allocation thereof can collectively be considered as determining an optimal resource configuration.

The disclosed technology can significantly accelerate exploration of a search space of resource configurations splitting out a problem of finding optimal node arrangement and a problem of allocating resources. For example, a distributed training loop (e.g., a DT-loop) can explore different combinations of node arrangements to determine an optimal node arrangement. A resource allocation loop (e.g., an RA-loop) can explore different allocation of computing resources to determine an optimal resource allocation among nodes. The two loops can work in conjunction to determine an optimal resource configuration. Further, the disclosed technology can intelligently prune a search space of DT-configurations to further accelerate exploration of the optimal resource configuration. The optimal resource configuration can be used to reduce the amount of time needed to perform multiple tasks/jobs. Upon identifying the optimal resource configuration, that optimal resource configuration can be used for future training. For example, the optimal resource configuration can be used in production training or in re-training cases.

It should be noted that although resource configuration optimization is described herein in the context of hyperparameter or deep learning parameter tuning, various embodiments can be applied to improve/optimize how resources may be allocated in other contexts. The resource configuration is not specific to any particular model or dataset and can be applied to other ML scenarios other than hyperparameter tuning as applicable.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters. In the context of the present disclosure optimal resource configuration or allocation can refer to a configuration(s) or allocation(s) of resources that provide a desirable completion time (e.g., a shortest completion time). However, other embodiments contemplated by the disclosed technology can be optimized in accordance with one or more other and/or alternative matrices or criteria, not limited to just completion time. Resource cost (cost to compute), for example, may be another metric or criteria upon which to perform optimization. The degree of optimization can also be varied in accordance with user needs/desires.

FIG. 1 illustrates an example of a hyperparameter tuning process, and will be described in conjunction with FIG. 2, an example distributed training environment for performing the hyperparameter tuning process. At operation 100, hyperparameter selection is performed/occurs. As alluded to above, hyperparameter or deep learning parameter optimization/tuning involves choosing a set of optimal hyperparameter values for an ML algorithm (i.e., a parameter whose value is used to control the learning process). In contrast, other parameters/the value of other types of parameters (typically node weights) are learned. For example, a ResNet-50 convolutional neural network model can have a hyperparameter of a learning rate, which can be tuned to control the learning process. Other parameters, such as parameters in each layer of the ResNet-50 convolutional neural network model, are trained and received as output of the model.

In order to optimize the model, the hyperparameters can be tuned. Tuning of the hyperparameters allows one or more values to be selected for use by/in the model. Examples of approaches to accomplish hyperparameter tuning can include grid searching, random searching, Bayesian optimization, gradient-based optimization, or the like. The disclosed technology can accelerate/optimize the execution of tasks making up the hyperparameter tuning. The hyperparameter parameters selected may be specific to a hyperparameter tuning algorithm. For example, an objective could be an image recognition and ResNet-50 could be a selected ML model. For the ML model, a learning rate could be a hyperparameter to tune and a grid search algorithm can be a selected hyperparameter tuning algorithm selected for the tuning of the learning rate. The learning rate is provided here as an example hyperparameter but other hyperparameters are also possible. In the example, a number of training jobs to be run can be generated by the grid search algorithm in order to return a value that may be used to set the learning rate hyperparameter. That is, testing values can be generated at 102. These training jobs ("boxes") can be executed at 104 in containers. Each container can be an instance of a parameter server or a worker node, executing processes or threads that handle one or more training jobs for one or more test values. Each parameter server or a worker node can be a container in a container platform, such as Kubernetes platform. A training job (a "box") can be distributed according to some resource configuration at 104A for each container. The resource configuration for a training job can specify a number of parameter servers needed, a number of workers needed, and how much computing resource to allocate to each node (e.g., a parameter server or a worker node). The example ResNet-50 model may then be trained using the resource configuration with a small data training subset trained using the distributed training architecture/system to see how the model performs when using/set to a particular learning rate value.

Following the ResNet-50 example, each training job can test a different hyperparameter (e.g., a different learning rate value) to give a sense of whether or not a particular test value is a "good" value or a "bad" value with its result(s). The model, the ResNet-50 model in this example, can be set to have a learning rate based on the result(s). Based on the result(s), an optimal learning rate (e.g., a learning rate test value that resulted in the most desirable result) and, thus, an optimal ResNet-50 model having the optimal learning rate, can be selected at 106. The hyperparameter selection tuning process can be applied to various other types of models and selection of various hyperparameters or other deep learning parameters.

Figure 2:
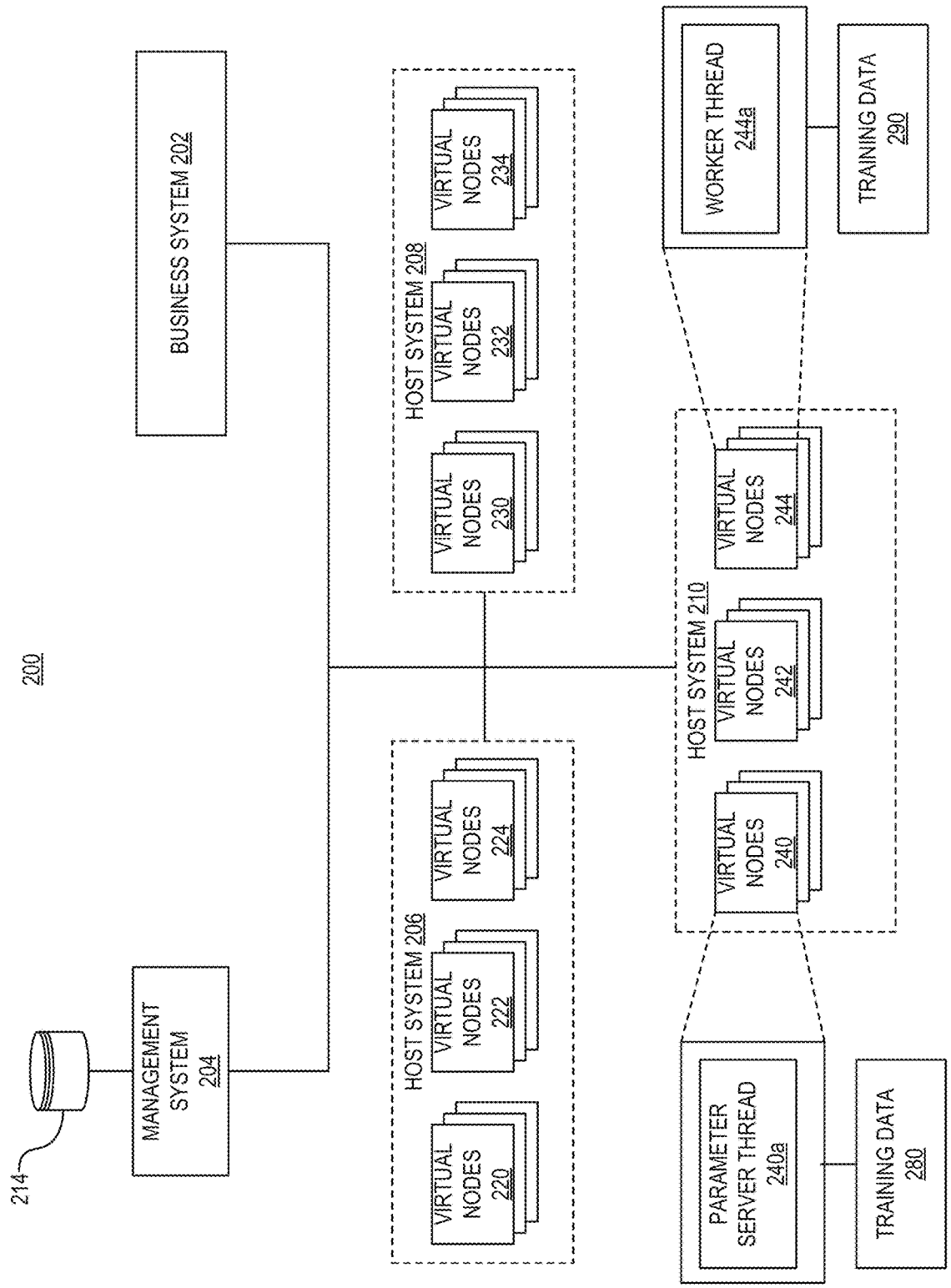
FIG. 2 illustrates an example distributed training environment for performing the hyperparameter tuning process of FIG. 1, in accordance with various embodiments.

FIG. 2 illustrates an example distributed training environment for performing the hyperparameter tuning process of FIG. 1, in accordance with various embodiments. As shown in FIG. 2, an environment 200 may include a business system 202, a management system 204, and a plurality of host systems 206, 208, 210, all communicatively coupled to each other over a communications network. The solid black line connecting the various elements of environment 200 may be a wired connection, a wireless connection, or a combination thereof, depending on the implementation. In various embodiments, the environment 200 may be implemented in a private cloud, a public cloud, a hybrid cloud, or other type of communications network.

The environment 200 provides a network environment for implementing machine learning models. The business system 202 can be any application within a network configured to provide some functionality to an end user. Each business system 202 may leverage one or more machine learning models to gain further insights into obtained data to help the business system 202 more accurately and effectively provide results to the end user. As a non-limiting example, an example business system 202 may be designed to identify the presence of one or more items or persons in a location based on captured images. The business system 202 could more effectively identify the items or persons by sending image data to one or more machine learning models of the environment 200 that are designed and trained to identify the one or more items or persons (e.g., face recognition models, scene parsing models, etc.). Although shown as a single system, the business system 202 can comprise a plurality of different business systems and applications. In some embodiments, the business system 202 can be one or more types of computing devices, including but not limited to a laptop, a desktop, a tablet, a server, among others. In some embodiments, the business system 202 may access the environment 200 through a web portal or other access point. In various embodiments, the business system 202 can also be realized as another host system (similar to host systems 206, 208, 210) within the environment 200 (i.e., also referred to as an "application cluster"). When implemented as an application cluster, the business system 202 can comprise a plurality of nodes, in this example virtual nodes (similar to the virtual nodes discussed below with respect to the host system 206, 208, 210) that represent the application cluster within environment 200.

As suggested by its name, the management system 204 manages the environment 200. The management system 204 can be configured to deploy clusters within the environment 200 using the host systems 206, 208, 210. These clusters may each comprise one or more virtual nodes, vapps, containers, workers/worker nodes, etc. to process data sets in parallel and perform specific operations within the environment 200. It should be understood that in a parameter server framework, groups of nodes (or a centralized server) can maintain globally shared parameters of a machine-learning model while the data and computation of calculating updates (i.e., gradient descent updates) are distributed across worker nodes. The clusters may deploy data processing frameworks or applications that may comprise Hadoop, Spark, TensorFlow, or other distributed data processing frameworks (i.e., compute engines). In various embodiments, storage repositories may be located on one or more other computing systems, such as server computers, desktop computers, or some other computing systems. The storage repositories may each represent data stored as a distributed file system, as object storage, or as some other data storage structure. Each deployment cluster can have an associated application programming interface (API) server configured for dependent distribution to allocate large-scale processing clusters in the environment 200, such as the dependent distribution described in U.S. Patent Publication No. 2017/0208138 titled "Allocating Edge Services With Large-Scale Processing Framework Clusters," which is hereby incorporated herein in its entirety.

The management system 204 can be configured to deploy one or more deployment clusters with one or more machine learning models attached therewith. Deployment of clusters and the deployment of machine learning models can be performed separately, with the deployment clusters being initialized without any machine learning models at the start, with machine learning models being attached while the deployment cluster is running. In deploying the deployment clusters, the management system 204 may be responsible for allocating computing resources of the host systems 206, 208, 210 to the clusters, and deploying the virtual nodes required for the clusters. The virtual nodes may comprise full operating system virtual machines or containers. The containers may comprise Linux containers, Docker containers, and other similar namespace-based containers. Rather than requiring a separate operating system, which is required for virtual machines, containers may share resources from the host computing system, wherein the resources may include kernel resources from the host operating system and may further include repositories and other approved resources that can be shared with other containers or processes executing on the host. However, although resources may be shared between the containers on a host system, the containers are provisioned to have private access to the operating system with their own identifier space, file system structure, and network interfaces. The operating system may also be responsible for allocating processing resources, memory resources, network resources, and other similar resources, to the containerized endpoint.

For managing the environment 200, the management system 204 can maintain one or more data structures that can be used to store job information associated with each of the resource configurations explored thereon. The one or more data structures may be stored in a database (not shown in FIG. 2) communicatively coupled to the management system 204. In some embodiments, management system 204 may be deployed as a separate cluster of computing devices within the environment 200, as a cluster of virtual nodes on a host system (e.g., host system 210), or a combination thereof. The database can be one or more local, non-transitory, machine-readable storage media associated with the management system 204, one or more remote, non-transitory, machine-readable storage media communicatively coupled to the management system 204, or a combination thereof. In various embodiments, the database may be non-volatile storage, including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. The database can be mounted on all host systems 206, 208, 210.

Based on the configuration parameters received through registration of machine learning models, the management system 204 can create a serialized version of the machine learning model that is stored a model container repository 214. The model container repository 214 can be one or more non-transitory machine-readable storage media including but not limited to flash memory, read-only memory (ROM), ferroelectric random access memory (fRAM), optical discs, solid-state devices (SSD), erasable programmable ROM (EPROM), electrically erasable programmable ROM (EEPROM), among others. The serialized machine learning models are deployable versions of the machine learning models that can be put into production for use by other systems within the environment 200.

When deploying a machine learning model on a deployment cluster, the management system 204 can mount the serialized version of one or more machine learning models from the repository 214 to the set of virtual nodes comprising the deployment cluster so that the virtual nodes will have access the serialized machine learning model in the repository 214 to be run and accessible on the deployment cluster. In various embodiments, the repository 214 can maintain the raw metadata associated with the machine learning model as well as the serialized machine learning model (which is obtained during registration).

In various embodiments, each machine learning model may have an associated data structure within the management system 204 database, while in other embodiments a data structure may include an entry or row associated with each machine learning model of a plurality of machine learning models registered with the management system 204. The data structure(s) can maintain the configuration parameters associated with each machine learning model, including but not limited to the name of the compute engine associated with the model, the serialization information used for the machine learning model (e.g., serialization format, serialization library, etc.), a list of required compute resources for the machine learning module, version information for the machine learning model, machine learning library(s) used with the machine learning model, among others.

Such configuration parameters may be hyperparameters that can be tuned. For example, each node (e.g., virtual node 240) may include a parameter server thread 240a and some subset of training data 280. As another example, each node (e.g., virtual node 244) may include a hyperparameter tuning worker thread 244a and some subset of training data 290 with which to train an instance of a machine learning model at virtual node 244. Following the above example, an instance of the ResNet-50 model may be trained by virtual node 244, where a particular learning rate value generated by the grid search algorithm can be set in the ResNet-50 model which is then trained using training data 290 (which is a subset or sample of collected training data, for example). At the beginning of each epoch, worker thread 244a may pull the learning rate hyperparameter (and/or other hyperparameters) stored in a tensor data structure and can train the model (e.g., a Resnet-50 model) according to the training data 290. That is, worker thread 244a may be a process that executes on virtual node 244 that determines data gradients based on a parameter copy and associated training data, where worker thread 244a calculates its data gradients, and along with other worker threads implemented across the various host systems 206, 208, 210 and virtual nodes 220-224, 230-234, 240-244 to determine a hyperparameter value to use for the model.

Returning to FIG. 1, the training jobs can be distributed in some manner according to some resource configuration at 104A that includes, but not necessarily limited to, a number of parameter servers needed, a number of workers needed, and how much CPU to allocate to each worker. That is, in the context of FIG. 2, a resource configuration may specify numbers of parameter servers and worker nodes and processing power/resources to be used by each worker thread needed to train a model during hyperparameter tuning to arrive at a desirable hyperparameter value.

It should be understood that distributed training can occur, generally, synchronously or asynchronously. Synchronous distributed training can be performed by training local models (e.g., at virtual nodes 220-224, 230-243, 240-244 of FIG. 2) using different parts or subsets of data from a single (large) data batch. In synchronous distributed training, all the nodes sent their gradients after all the nodes have completed their training, after which a "global" model can be updated. In asynchronous distributed training, no training device, e.g., virtual nodes 220-224, 230-243, 240-244) need to wait for other nodes/devices to complete their training. Central parameter servers can be used to aggregate shared gradients as each node completes its respective training. It should be noted that in some cases, a model itself can be segmented into different parts that can be concurrently trained using the same data (subset of data) at different nodes, while in some cases, the training data is divided into multiple subsets (data parallelism), each of which can be used to train a common, local model at each node, after which the model parameters can be shared and aggregated. In some embodiments, asynchronous distributed training can be performed by the virtual nodes of FIG. 2 in accordance with a data parallelism scheme. That is, each of virtual nodes 220-224, 230-243, 240-244 may train the same instance/version of a model, in this case the aforementioned ResNet-50 model, using different subsets of training data (training data 290). It should be noted that such an architecture is not the only architecture that can be optimized in accordance with various embodiments, but in some cases, may provide the greatest possibility for improvement.

Figure 3:
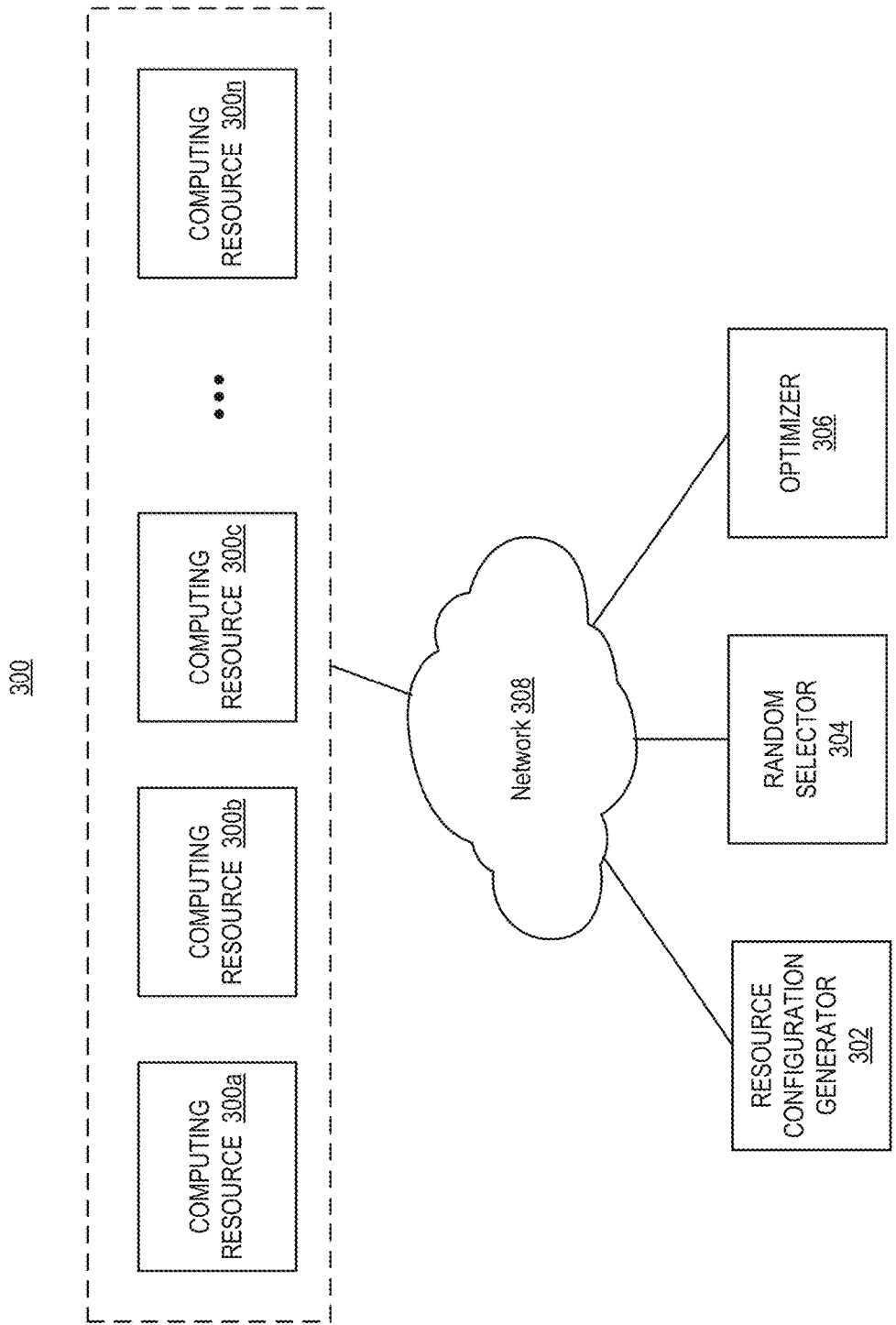
FIG. 3 illustrates an example system architecture of an orchestration platform for performing resource configuration optimization, in accordance with various embodiments.

FIG. 3 illustrates an example system architecture of an orchestration platform for performing resource configuration optimization and will be described in conjunction with FIG. 4, an example architecture for a resource configuration optimization method. Architecture 300 can include a resource configuration generator 302, a random selector 304, and an optimizer 306 operatively communicating through a network 308 to generate and/or select an optimal resource configuration with which to perform hyperparameter tuning in a distributed training environment, such as environment 200 (FIG. 2). Architecture 300 can include additional components/elements, or fewer components/elements. Architecture 300 can be provided as part of an orchestration platform or service. For example, architecture 300 may be implemented as part of a Kubernetes platform to allocate resources for containers running model training jobs and scheduling those jobs, e.g., determining how many servers are available, and which servers to select to execute such training jobs.

Network 308 can include any combination of electronics communications networks enabling communication between components of architecture 300. For example, network 308 may include the Internet and/or any type of wide area network, an intranet, a metropolitan area network, a local area network (LAN), a wireless network, a cellular communications network, a Bluetooth network, a radio network, a device bus, or any other type of electronics communications network known to one of skill in the art.

As described above, each of computing resources 300a, 300b, 300c, . . . 300n, may represent some aspect of memory, parameter server(s), worker(s), and CPU allocated to each of the worker(s) that can be combined into a configuration of resources for hyperparameter tuning. Resource configuration generator 302, random selector 304, and optimizer 306, may make up, at least in part, an orchestration platform, and may each comprise or include one or more computing devices or processors adapted to generate a resource configuration, randomly select training jobs to be executed, and optimize resource configuration, respectively, in accordance with available computing resources that can be leveraged to perform hyperparameter tuning. In some embodiments, as discussed above, optimal resource allocation can refer to a resource configuration that can complete the model training jobs in the least amount of time.

Figure 4:
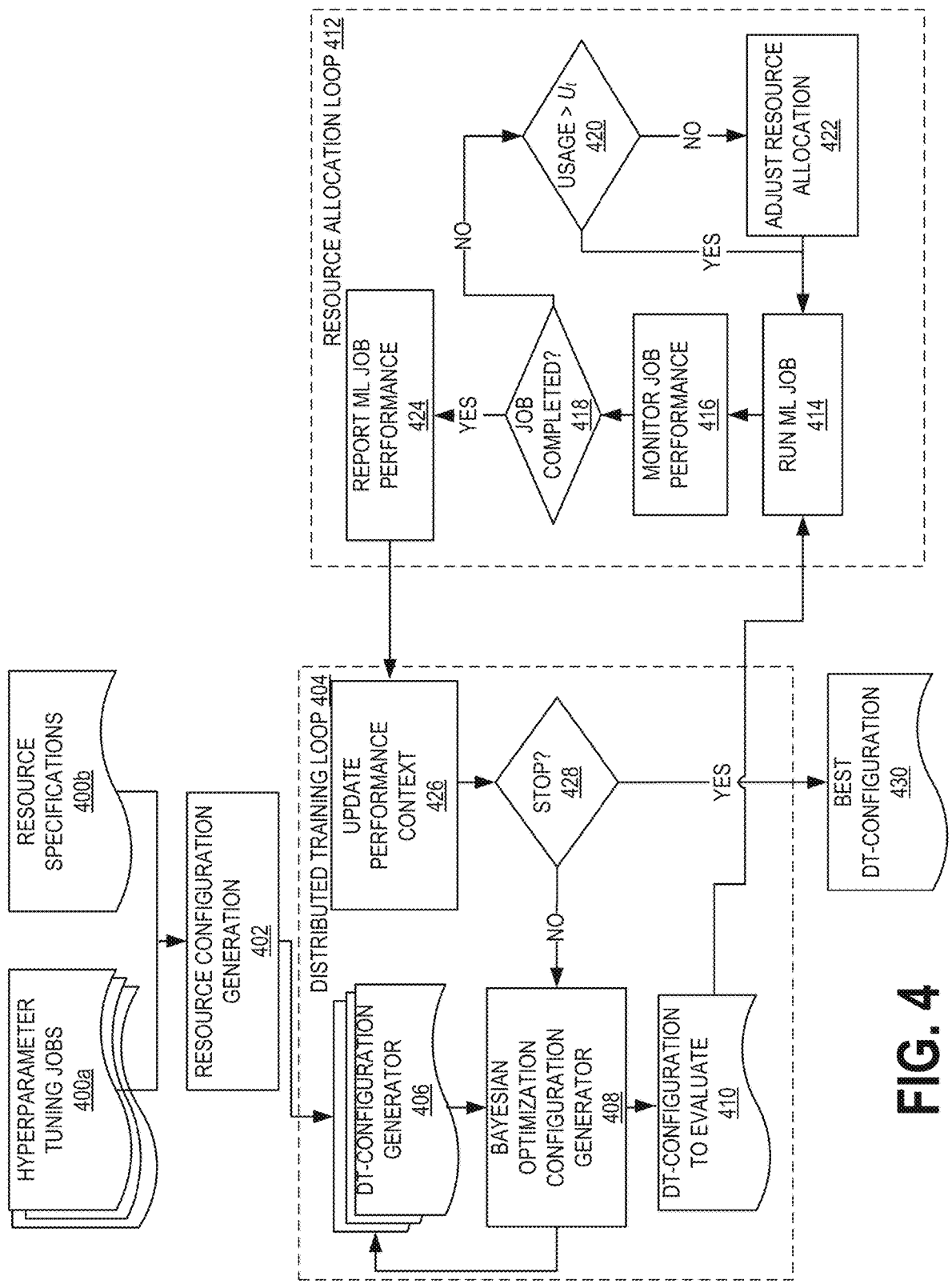
FIG. 4 illustrates an example architecture for a resource configuration optimization method, in accordance with various embodiments.

FIG. 4 illustrates an example architecture for a resource configuration optimization method, in accordance with various embodiments. The example resource configuration optimization method can accelerate hyperparameter tuning process. Particularly, the example resource configuration optimization method can use a dual loop solution to determine an optimal resource configuration. The dual loop can include a distributed training loop (i.e., a DT-loop) and a resource allocation loop (i.e., an RA-loop). In the example architecture, the DT-loop can use optimization method to find the best distributed training configuration (i.e., DT-config) that specifies a number of parameter servers and a number of worker nodes to use in the hyperparameter tuning. In some embodiments, a Bayesian optimization algorithm can be used in the DT-loop. Additionally, various heuristics can be used to limit a search space of the DT-configurations to further improve performance (e.g., shortening exploration time of the search space) of the DT-loop. The RA-loop can re-allocate resource usage to find the best allocation of computing resources (e.g., CPU and/or memory) for the hyperparameter tuning.

As illustrated, hyperparameter tuning jobs 400a can be provided as inputs to resource configuration generation operation at 402. Each hyperparameter tuning job can include an ML model to be trained and associated hyperparameter test values that are to be evaluated. A hyperparameter tuning algorithm may generate a number of tasks/training jobs to be performed, each with a set of one or more hyperparameter test values. For example, in the ResNet-50 example of FIG. 1, hyperparameter test values can be generated using a grid search algorithm. Similarly, resource specifications 400b can be provided as inputs to the resource configuration generation operation at 402. Some example resource specifications 400b can include: how much resources (e.g., CPU) should be used for a single ML training job and an associated budget, a minimal number of resources for one container, a resource allocation threshold, how many parallel (P) jobs are to be run, or the like. In some embodiments, if the resource specifications 400b does not define P, a value of P can be computed based on all available resources on a cluster based on a resource budget for a single ML training job. The resource specifications 400b can have an impact on the cost of performing the training jobs if the training jobs are to be performed on some paid platform.

At the resource configuration generation operation 402, the resource configuration generator 302 of FIG. 3 can generate DT-configurations that define a DT-configuration search space 406 of 2-tuples $<n_{ps}; n_{wk}>$, where $n_{ps}$ is a number representing a number of parameter servers and $n_{wk}$ is a number representing a number of worker nodes. The DT-configuration search space 406 can contain all possible (and/or reasonable) resource configurations of the 2-tuples. For example, with a resource budget of 10 CPUs, possible DT-configuration search space can contain 45 resource configurations (e.g., <9 ps; 1 wk>, <8 ps; 1 wk>, <8 ps; 2 wk>, <7 ps; 1 wk>, <7 ps; 2 wk>, <7 ps; 3 wk>, . . . , <1 ps; 9 wk>). In some embodiments, less than an integer (e.g., 0.5) increments can be used to generate DT-configurations such as <1.5 ps; 5.5 wk>. The resource configuration generator 302 can take, as input, various parameters that specify how to generate the DT-configurations. While the 2-tuples of parameter servers and worker nodes are provided as example DT-configurations, it is noted that the DT-configurations can comprise other types of parameters and tuples thereof.

Once the DT-configurations are generated and the DT-configuration search space 406 is defined by the DT-configurations, the resource configuration optimization method can enter a distributed training loop 404 (i.e., DT-loop). In the DT-loop 404, at 408, a Bayesian optimization configuration generator 408 can select/generate a DT-configuration in the DT-configuration search space 406. Generally, a DT-configuration is selected/generated based on the current performance context which contains information of previously explored DT-configurations and corresponding ML job performance information (e.g., ML job completion times). However, for the first DT-configuration, there may not be a performance context associated with previously explored DT-configurations. Thus, an initial DT-configuration can be selected/generated using an algorithm, including a random selection algorithm. The selected/generated DT-configuration 410 and its hyperparameters are then provided to the RA-loop 412. In some embodiments, the Bayesian optimization configuration generator 408 selects/generates P DT-configurations to start the first P parallel ML training jobs.

The Bayesian optimization can be performed by optimizer 306 of FIG. 3 to determine, based on prior executions of jobs using possible DT-configurations, what remaining possible DT-configurations may correspond to an optimal resource configuration. Although Bayesian optimization is used, other optimization techniques are possible. Using Bayesian optimization, the confidence gained through additional iterations (in this case executing training jobs in accordance with possible resource configurations) results in being able to better narrow down possible resource configurations. Generally, Bayesian optimization analyzes possible parameter values (in this case, DT-configuration candidates), and gradually outputs specific parameter values (again, in this case, specific DT-configuration candidates determined as being optimal) for achieving shortest possible job completion time to try/test/evaluate. That is, a job completion time can be determined based on a particular DT-configuration, which can be fed back into the Bayesian optimization process that will assess its effectiveness based on historical information, and a next DT-configuration candidate to try/test/evaluate can be output.

At 414, the RA-loop 412 can run one or more (e.g., a batch of) ML jobs based on the selected/generated DT-configuration(s) 410. In some embodiments, the one or more ML jobs can be randomly selected by the random selector 304 of FIG. 3 to provide a small subset of training data. At 416, the RA-loop 412 monitors each ML job performance of associated DT-configuration 410. A ML job performance can include a completion time, training speed, or other performance metric(s) for the ML job using the hyperparameters in the associated DT-configuration 410. At 418, the RA-loop 412 determines whether the ML job has completed. At 424, if the ML job has completed, then the RA-loop 412 reports the monitored job performance to the DT-loop 404 such that the DT-loop 404 can update performance context for the ML job at 426.

At 420, if the ML job has not completed, the RA-loop 412 may adaptively re-allocate computing resources parameter servers and worker nodes in real-time. The re-allocation of the computing resources for the ML job can be based on whether the computing resources are at or above a threshold level of utilization (e.g., Ut). In some embodiments, the threshold level can be a percentage threshold, such as 90%. If more than the threshold level of computing resources are utilized, the RA-loop 412 may continue to run the ML job 414. On the other hand, if the computing resources are utilized less than the threshold level of utilization, the RA-loop 412 can trigger an adjustment (i.e., re-allocation) of the computing resources in real-time at 422. The threshold level of utilization may be defined in converse, such as with a threshold level of idleness (e.g., 10%), and the resource re-allocation can be triggered when computing resource usage rises above the threshold level of idleness.

In some embodiments, when the resource re-allocation is triggered, the RA-loop 412 can save ML job progress (e.g., a checkpoint), re-compute how much computing resources should be allocated among parameter servers and worker nodes, re-allocate the computing resources, and resume the ML job from the checkpoint. In a resource re-allocation, the idle resources from either parameter server or worker nodes can be reclaimed and re-allocated to other nodes with higher resource demand/utilization. In some embodiments, various algorithms/filters can be used to avoid overreacting to bursty resource utilizations. For example, a counter-based approach can be used to smooth collection resource utilization information. Additionally, one or more parameters can specify how much portion to reclaim of the idle resources to provide some breathing room for each ML job. For example, a parameter can specify that only 90% of the idle resources should be reclaimed. The process of adaptive resource re-allocation can be repeated until a stable allocation is found. Once the stable allocation is found, the allocation can be used to configure the ML job until its completion.

Returning to the DT-loop 404, at 426, the DT-loop 404 receives reports of ML job performance 424 and updates the current performance context. Each time an ML job completes, the job performance 424 is reported to the DT-loop 404. At 428, the DT-loop can determine whether a stopping criterion (e.g., a termination condition) has been reached.

The stopping criterion can be an improvement in the completion time between the best DT-configuration and the second best DT-configuration is at or smaller than a threshold level of time difference. That is, a current completion time associated with job performance using a current resource configuration candidate can be compared to a previous completion time associated with a previously tested resource configuration candidate. If the current completion time does not improve over the previous completion time by at least the threshold level of time difference, that current resource configuration candidate can be deemed "good enough," such that subsequent resource configuration candidate testing can stop. Other types of a threshold value and stopping criteria can be specified and used. For example, a percentage threshold for determining percentage improvement over the previous completion time can be used.

In some embodiments, the stopping criterion can be a maximum number of resource configuration explored. For example, if there are 140 possible resource configuration candidates, a stopping criterion of 70 trials can be set so that upon completion of the 70th job execution using the 70th resource configuration candidate, the DT-loop can terminate. The resource configuration candidate producing the best completion time in those 70 trials may be selected as the optimum resource configuration to use for the remaining jobs. The maximum number of resource configuration can be an integer value, some percentage of the total number of generated possible resource configurations, or the like.

If the DT-loop 404 determines that at least one of the above conditions is reached, then the DT-loop 404 can exit with the best DT-configuration at 430. If, however, further reduction in completion time is required/desired, the search for an optimal DT-configuration can continue. The DT-loop 404 can again select/generate a DT-configuration at 408 and repeat the process. In some embodiments, execution history can be stored or exported to a log on persistent storage, such as disk storage that is local or remote.

Figure 5:
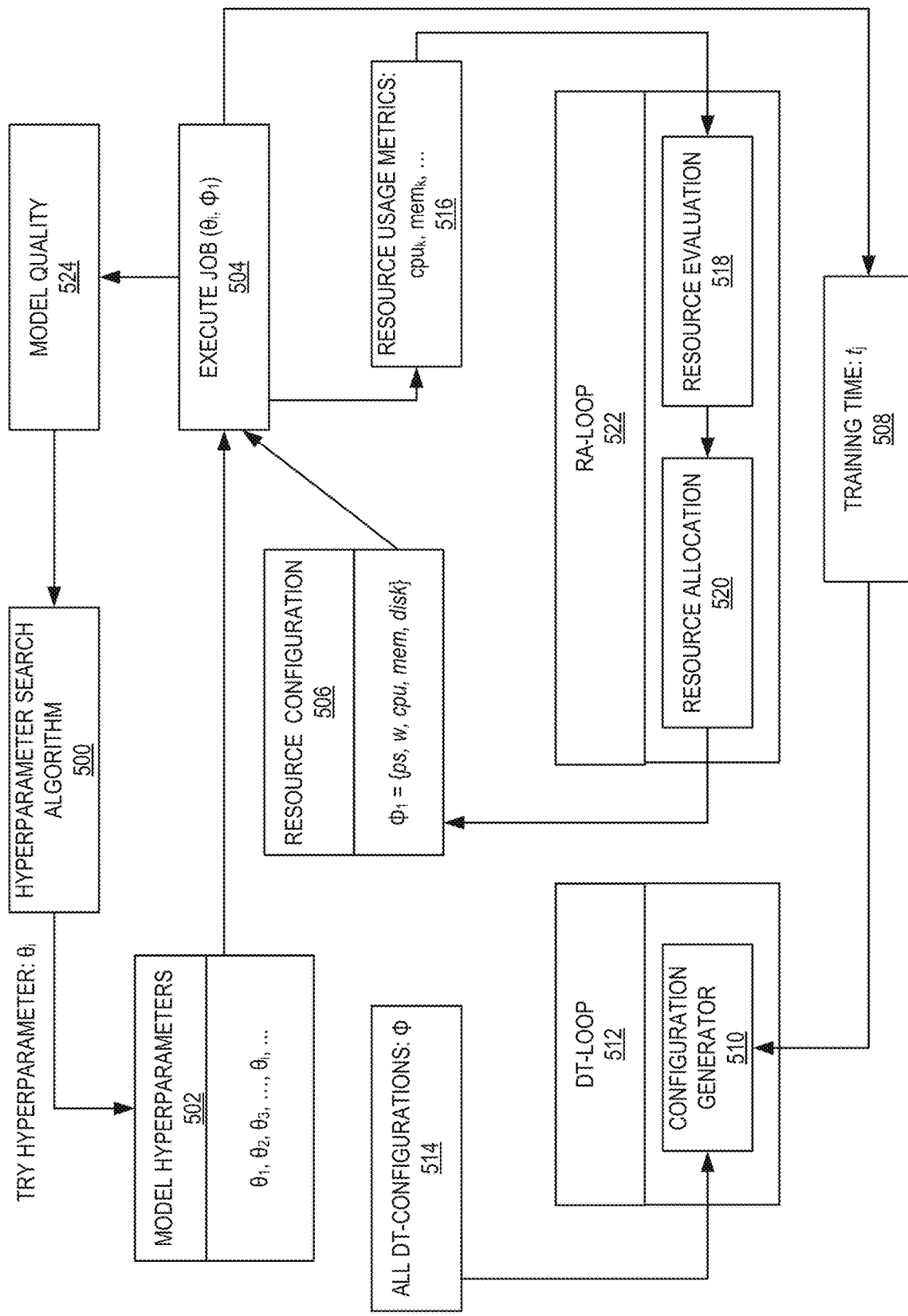
FIG. 5 illustrates example operations that may be performed to determine an optimal resource configuration in the context of hyperparameter tuning, in accordance with various embodiments.

FIG. 5 illustrates example operations that may be performed to determine an optimal resource configuration in the context of hyperparameter tuning, in accordance with various embodiments. As described above, algorithms for hyperparameter searching/tuning exist (e.g., grid searching, random searching, gradient-based optimization, or the like) for a model to be trained. Upon selection of such an algorithm, at 500, that algorithm can be applied to generate model hyperparameters values 502 ($\theta_1$, $\theta_2$, $\theta_3$, . . . , $\theta_i$, . . . ) to try/test/evaluate for the model. In hyperparameter tuning, small training data subsets may be used to execute training jobs. The training jobs are tasks/jobs that can be performed at 504 to determine which model hyperparameter values 502 result in optimal model performance.

Resource configurations can specify a number of parameter servers, a number of worker nodes, CPU allocation, memory allocation, disk space, or the like (e.g., $\phi_1$={ps, w, cpu, mem, disk}) for a distributed training environment. The resource configuration can be a combination of a DT-configuration (e.g., {ps, w}) of FIG. 4 and a computing resource budget (e.g., {mem, disk}). A training job can be performed at 504 to test quality of selected hyperparameters (e.g., $\theta_i$) with a selected resource configuration (e.g., $\phi_1$). Thus, different resource configurations may be used to execute different subsets of training jobs at 504.

The disclosed technology seeks to optimize resource configurations to achieve the shortest completion (training) time $t_j$ 508 for those training jobs. In distributed training, the different resource configurations (e.g., $\phi_1$) can impact how quickly a training job is completed for a selected set of hyperparameters. The training time $t_j$ or other performance metrics can be provided to a configuration generator of a DT-loop 512 at 510. Based on the performance metrics, the next DT-configuration to evaluate can be selected/generated from a search space of all DT-configurations 514. The new resource configuration can be used to execute another training job. In order to speed up the process of determining which resource configurations provide the shortest completion/training time for hyperparameter tuning, Bayesian optimization techniques may be applied at 510 to the search space of all resource configurations 514 to arrive at the aforementioned resource configurations 506 to be tested. The selection of the next resource configuration can be iterated until a termination condition (e.g., a stopping criterion) is met.

Referring back to the execution of a training job at 504, during the execution, various resource usage metrics can be monitored. For example, CPU usage and/or memory usage ($cpu_k$, $mem_k$) or other resource usage metrics can be monitored at 516. The monitored resource usage metrics can be evaluated at 518 of a RA-loop 522 to determine whether a resource usage of a container can be improved (e.g., higher utilization of computing resources and/or lower idle computing resources). As mentioned with respect to FIG. 4, one or more threshold level of utilization or idleness can be used to evaluate the monitored resource usage metrics. If a re-allocation of the computing resources is desirable, some computing resources of the container are reclaimed and re-allocated at 520 of the RA-loop 522. The re-allocated computing resources can be used to update the resource configuration at 506. The updated resource configuration can be used to execute one or more training jobs at 504. The one or more training job can be the same training job from which resource usage metrics were evaluated or a different training job.

A resource configuration that results in the best performance metrics (e.g., shortest training time) compared to previous resource configurations can be selected as an optimal resource configuration. Alternatively, a resource configuration that satisfy a termination condition (e.g., completing within a predefined training time) can be selected as an optimal resource configuration. If the optimal resource configuration is found, remaining training jobs can be executed using the optimal resource configuration at 504.

At 524, model quality can be determined for hyperparameters used to execute the training job. If the model quality does not satisfy a termination condition, a new hyperparameter can be selected. Hyperparameter tuning can continue with the new hyperparameter and the process can iterate until the hyperparameters that provide the best model quality are determined.

Figure 6:
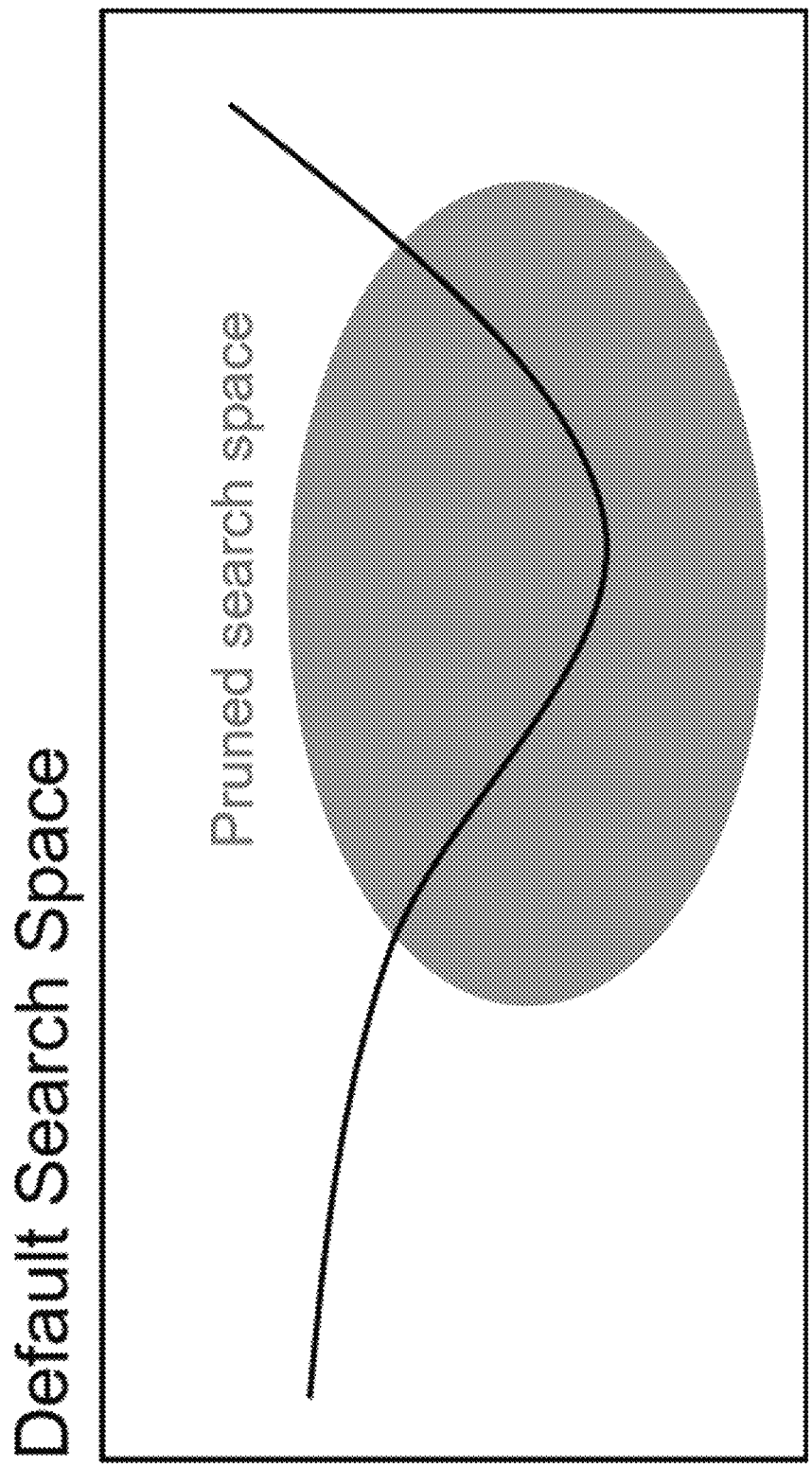
FIG. 6 illustrates an example pruning of a distributed training configuration (DT-configuration) search space, in accordance with various embodiments.

FIG. 6 illustrates an example pruning of a DT-configuration search space. Evaluating each DT-configuration of the search space can demand large resource budget (e.g., takes much computing resources and time). To prune DT-configs that are not good candidates and only evaluate DT-configs that can potentially result in an optimal resource configuration, the disclosed technology can employ an intelligent pruning of the search space that evaluates select DT-configurations.

In some embodiments, the intelligent pruning can reduce the search space by limiting a number of parameter servers and worker nodes to a number of total nodes. For example, the search space can be limited by a condition: "ps+wk≤10", where 10 is a desired number (e.g., a budget) of total nodes to be used. In the example, the budget of 10 nodes modifies possible DT-configuration search space to contain 45 DT-configurations (e.g., <9 ps; 1 wk>, <8 ps; 1 wk>, <8 ps; 2 wk>, <7 ps; 1 wk>, <7 ps; 2 wk>, <7 ps; 3 wk>, . . . , <1 ps; 9 wk>). Based on the condition, the searching of the optimal resource configuration can be limited to the 45 DT-configurations.

As alluded above, in some embodiments, Bayesian optimization can be used to select/generate the next DT-configuration to evaluate. An implementation of Bayesian optimization may reach out of the modified search space to acquire the next DT-configuration. For example, in the example above, Bayesian optimization may select <4 ps; 12 wk> (e.g., a total of 16 nodes) that is outside the modified (e.g., pruned) search space. To prevent selection/generation of an undesirable DT-configuration outside the pruned search space, DT-configurations outside the pruned search space can be assigned dummy values. The dummy values can be values that reflect the worst DT-configuration evaluated thus far or values that are impractical. Accordingly, the resource configuration generator 302 of FIG. 3 can cause the resource configuration to skip the undesirable DT-configuration.

Figure 7:
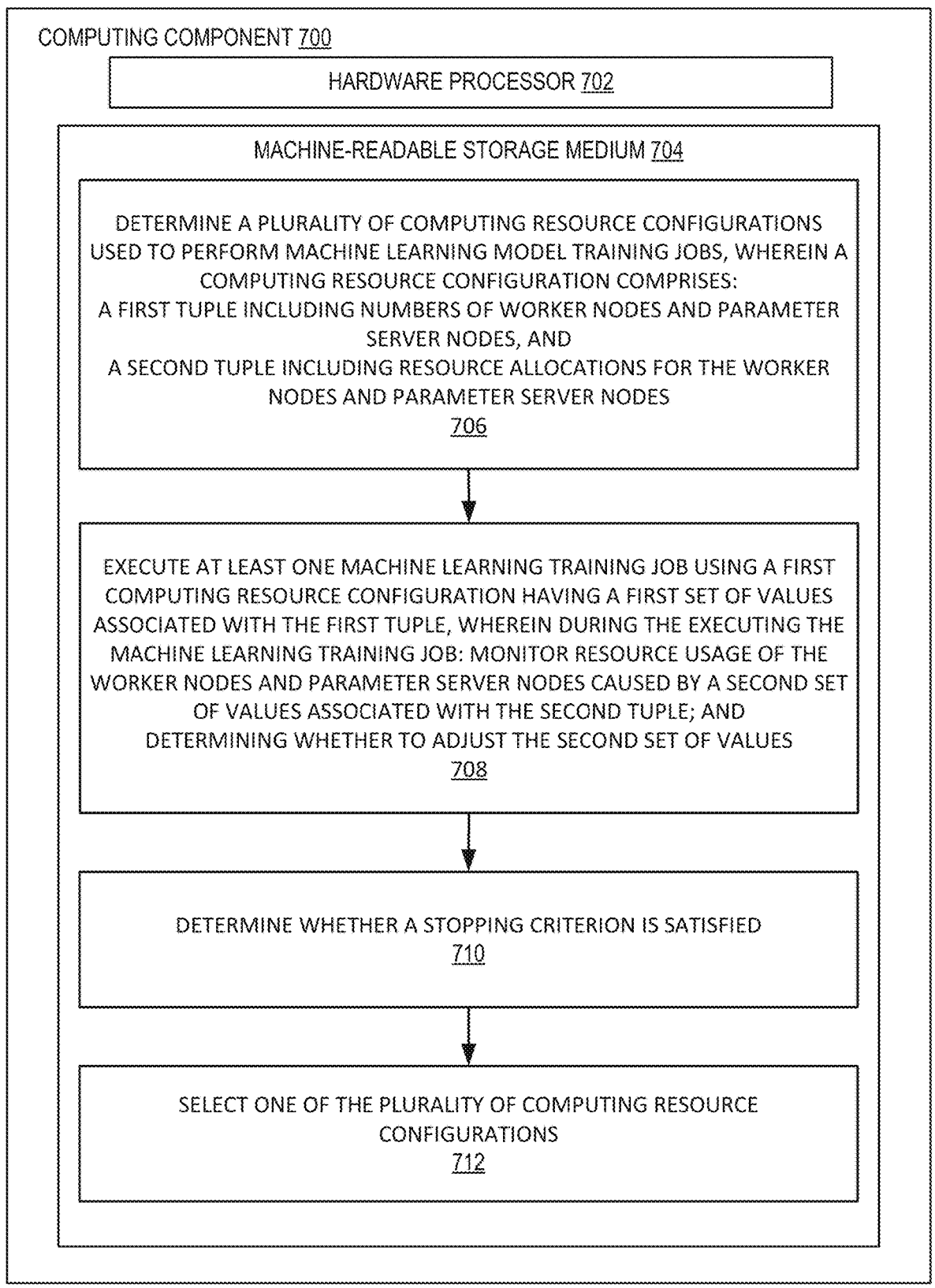
FIG. 7 illustrates an example computing component that may be used to implement various features of resource configuration optimization in accordance with one embodiment of the disclosed technology.

FIG. 7 is an example computing component 700 that may be used to implement various features of resource configuration optimization in accordance with one embodiment of the disclosed technology. Computing component 700 may be, for example, a server computer, a controller, or any other similar computing component capable of processing data. In the example implementation of FIG. 7, the computing component 700 includes a hardware processor 702, and machine-readable storage medium 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-712. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-714.

Hardware processor 702 may execute instruction 706 to determine a plurality of computing resource configurations used to perform machine learning model training jobs. The computing resource configuration can comprise: a first tuple including numbers of worker nodes and parameter server nodes, and a second tuple including resource allocations for the worker nodes and parameter server nodes.

Hardware processor 702 may execute instruction 708 to execute at least one machine learning training job using a first computing resource configuration. The first computing resource configuration can have a first set of values associated with the first tuple. During the executing the machine learning training job, resource usage of the worker nodes and parameter server nodes caused by a second set of values associated with the second tuple can be monitored. Further, during the executing the machine learning training job, whether to adjust the second set of values can be determined.

Hardware processor 702 may execute instruction 710 to determine whether a stopping criterion is satisfied.

Hardware processor 702 may execute instruction 712 to select one of the plurality of computing resource configurations. The selected computing resource configuration can be the optimal resource configuration.

FIG. 7 Illustrates example operations that may be performed to determine an optimal resource configuration in the context of hyperparameter tuning using TensorFlow distributed deep learning framework. As described above, algorithms for hyperparameter searching/tuning exist, e.g., grid searching, random searching, gradient-based optimization, etc. Upon selection of such an algorithm, at 700, that algorithm can be applied to hyperparameters of a model (model hyperparameters 702) to be trained. In hyperparameter tuning, small training data subsets may be used to execute training jobs. The training jobs are tasks/jobs that can be performed at 704 to determine which hyperparameter values result in optimal model performance.

In accordance with various embodiments, resource configurations, e.g., a number of parameter servers, a number of workers/worker threads, CPU allocation, memory allocation, and disk space can be specified for a TensorFlow training job 706 (when distributed mode training is occurring in a TensorFlow framework). These different resource configurations can impact how quickly the training jobs are completed, and can reflect a number of parameter servers (node groups), CPU allocation, memory allocation, disk allocation, etc.). Accordingly, as described herein, various embodiments seek to optimize resource configurations, in this example, resource configurations, to achieve the quickest completion (training) time 708 for those training jobs. Thus, different resource configurations 706 may be used to execute different subsets of training jobs at 704.

In order to speed up the process of determining which resource configurations provide the quickest completion/training time for hyperparameter tuning, Bayesian optimization techniques may be applied at 710 to all (expect the first) potential resource configurations 712 to arrive at the aforementioned resource configurations 706 to be tested. At 714, model quality is determined to see if the optimal resource configuration has been found to run the training jobs in the least amount of time. If so, any remaining training jobs can be executed using the optimal resource configuration.

Figure 8:
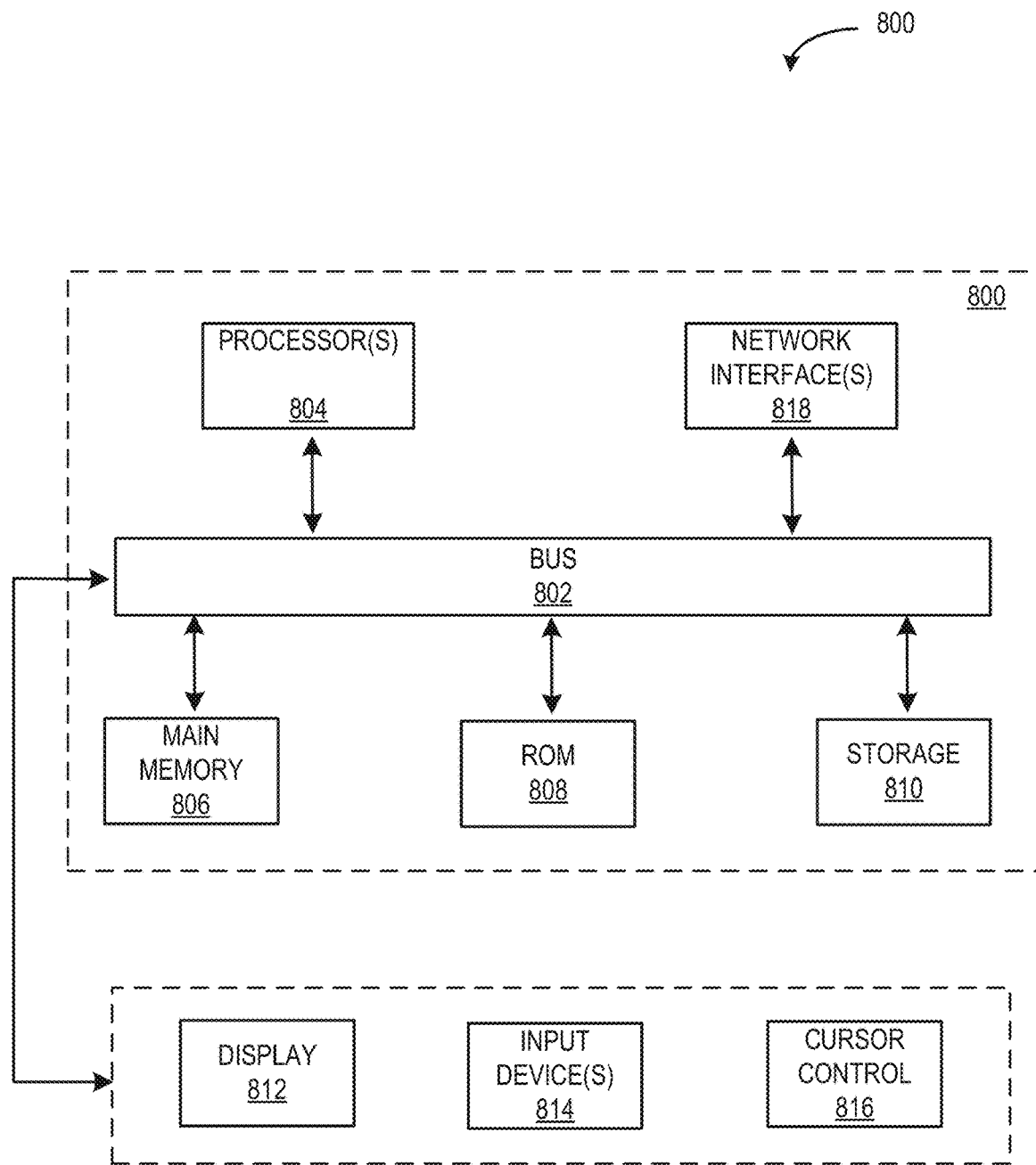
FIG. 8 illustrates an example computing component that may be used to implement various features of embodiments of the present disclosure.

FIG. 8 depicts a block diagram of an example computer system 800 in which various embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicate with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the worldwide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit or component might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits or components described herein might be implemented as discrete circuits/components or the functions and features described can be shared in part or in total among one or more circuits/components. Even though various features or elements of functionality may be individually described or claimed as separate circuits/components, these features and functionality can be shared among one or more common circuits/components, and such description shall not require or imply that separate circuits/components are required to implement such features or functionality. Where a circuit/component is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   determining a plurality of computing resource configurations used to perform machine learning model training jobs, wherein a computing resource configuration comprises:
     a first tuple including numbers of worker nodes and parameter server nodes, and
     a second tuple including resource allocations for the worker nodes and parameter server nodes;
   executing at least one machine learning training job using a first computing resource configuration having a first set of values associated with the first tuple, wherein during the executing the machine learning training job:
     monitors resource usage of the worker nodes and parameter server nodes caused by a second set of values associated with the second tuple; and
     determines whether to adjust the second set of values;
   determining whether a stopping criterion is satisfied; and
   selecting one of the plurality of computing resource configurations.

2. The method of claim 1, wherein the executing the at least one machine learning training job comprises:
   selecting the first tuple from a search space of tuples that each include different numbers of worker nodes and parameter server nodes;
   executing a first loop with the first tuple to determine at least one performance metric associated with the first tuple;
   selecting a different tuple from the search space of tuples;
   executing the first loop with the different tuple to determine at least one performance metric associated with the different tuple; and
   based on the at least one performance metrics associated with the first tuple and the different tuple, configuring the first loop to execute the next machine learning model training job with numbers of worker nodes and parameter server nodes specified in the different tuple.

3. The method of claim 2, further comprising:
   receiving a maximum number of nodes to use for the machine learning training job;
   based on the maximum number of nodes, determine different combinations of a first number of worker nodes and a second number of parameter servers, wherein the first number and the second number in a combination of the different combinations are, together, less than or equal to the maximum number of nodes; and
   determining a subset of the search space that only contains the different combinations.

4. The method of claim 3, wherein the different tuple is selected using Bayesian optimization, the method further comprises:
   assigning values to tuples not in the subset of the search space, wherein the values cause the tuples to be excluded from selection during execution of the first loop.

5. The method of claim 1, wherein the second tuple includes at least one of a specified central processing unit (CPU) allocation or a memory allocation.

6. The method of claim 5, wherein the executing the at least one machine learning training job comprises:
   executing a second loop with the second tuple to determine at least one performance metric associated with the second tuple;
   determining that a condition for re-allocating at least one of the specified CPU allocation and the memory allocation is satisfied;
   reclaiming at least some resource from at least one of a CPU associated with the specified CPU allocation or a memory associated with the memory allocation; and
   providing at least one of a new CPU allocation or a new memory allocation for execution of the at least one machine learning training job.

7. The method of claim 6, wherein the condition is associated with at least one of a threshold level of resource utilization or a threshold level of resource idleness.

8. The method of claim 1, wherein the stopping criterion comprises at least one of:
   a number of computing resource configurations to be tested; or
   an improvement of at least one performance metric between the first computing resource configuration and a second computing resource configuration, wherein the improvement is compared against a specified threshold level of improvement.

9. The method of claim 1, wherein the optimal configuration is used in execution of remaining machine learning jobs of the at least one machine learning job.

10. The method of claim 1, wherein:
    the at least one machine learning job is a hyperparameter tuning machine learning job,
    the at least one machine learning job is executed on a container comprising the worker nodes and the parameter nodes, and
    the container is part of a distributed training environment.

11. A system comprising:
    at least one processor; and
    a memory storing instructions that, when executed by the at least one processor, cause the system to perform a method comprising:
    determining a plurality of computing resource configurations used to perform machine learning model training jobs, wherein a computing resource configuration comprises:
      a first tuple including numbers of worker nodes and parameter server nodes, and
      a second tuple including resource allocations for the worker nodes and parameter server nodes;
    executing at least one machine learning training job using a first computing resource configuration having a first set of values associated with the first tuple, wherein during the executing the machine learning training job:
      monitors resource usage of the worker nodes and parameter server nodes caused by a second set of values associated with the second tuple; and
      determines whether to adjust the second set of values;
    determining whether a stopping criterion is satisfied; and
    selecting one of the plurality of computing resource configurations.

12. The system of claim 11, wherein the executing the at least one machine learning training job comprises:

selecting the first tuple from a search space of tuples that each include different numbers of worker nodes and parameter server nodes;

executing a first loop with the first tuple to determine at least one performance metric associated with the first tuple;

selecting a different tuple from the search space of tuples;

executing the first loop with the different tuple to determine at least one performance metric associated with the different tuple; and based on the at least one performance metrics associated with the first tuple and the different tuple, configuring the first loop to execute the next machine learning model training job with numbers of worker nodes and parameter server nodes specified in the different tuple.

13. The system of claim 12, wherein the instruction cause the system to further perform:

receiving a maximum number of nodes to use for the machine learning training job;

based on the maximum number of nodes, determine different combinations of a first number of worker nodes and a second number of parameter servers, wherein the first number and the second number in a combination of the different combinations are, together, less than or equal to the maximum number of nodes; and determining a subset of the search space that only contains the different combinations.

14. The system of claim 13, wherein the different tuple is selected using Bayesian optimization, wherein the instructions cause the system to further perform:

assigning values to tuples not in the subset of the search space, wherein the values cause the tuples to be excluded from selection during execution of the first loop.

15. The system of claim 1, wherein the second tuple includes at least one of a specified central processing unit (CPU) allocation or a memory allocation.

16. A non-transitory computer-readable storage medium including instructions that, when executed by at least one processor of a computing system, cause the computing system to perform:

determining a plurality of computing resource configurations used to perform machine learning model training jobs, wherein a computing resource configuration comprises:

a first tuple including numbers of worker nodes and parameter server nodes, and a second tuple including resource allocations for the worker nodes and parameter server nodes;

executing at least one machine learning training job using a first computing resource configuration having a first set of values associated with the first tuple, wherein during the executing the machine learning training job:

monitors resource usage of the worker nodes and parameter server nodes caused by a second set of values associated with the second tuple; and determines whether to adjust the second set of values;

determining whether a stopping criterion is satisfied; and selecting one of the plurality of computing resource configurations.

17. The non-transitory computer-readable storage medium of claim 16, wherein the executing the at least one machine learning training job comprises:

selecting the first tuple from a search space of tuples that each include different numbers of worker nodes and parameter server nodes;

executing a first loop with the first tuple to determine at least one performance metric associated with the first tuple;

selecting a different tuple from the search space of tuples;

executing the first loop with the different tuple to determine at least one performance metric associated with the different tuple; and based on the at least one performance metrics associated with the first tuple and the different tuple, configuring the first loop to execute the next machine learning model training job with numbers of worker nodes and parameter server nodes specified in the different tuple.

18. The non-transitory computer-readable storage medium of claim 17, wherein the instruction cause the computing system to further perform:

receiving a maximum number of nodes to use for the machine learning training job;

based on the maximum number of nodes, determine different combinations of a first number of worker nodes and a second number of parameter servers, wherein the first number and the second number in a combination of the different combinations are, together, less than or equal to the maximum number of nodes; and determining a subset of the search space that only contains the different combinations.

19. The non-transitory computer-readable storage medium of claim 18, wherein the different tuple is selected using Bayesian optimization, wherein the instructions cause the computing system to further perform:

assigning values to tuples not in the subset of the search space, wherein the values cause the tuples to be excluded from selection during execution of the first loop.

20. The non-transitory computer-readable storage medium of claim 16, wherein the second tuple includes at least one of a specified central processing unit (CPU) allocation or a memory allocation.

* * * * *